US012747189B2

(12) United States Patent
Wang et al.

(10) Patent No.: US 12,747,189 B2
(45) Date of Patent: Sep. 29, 2026

(54) SOUND-ABSORBING MATERIAL BLOCK, METHOD FOR PREPARING THEREOF, AND ELECTRONIC DEVICE

(71) Applicant: AAC Technologies (Nanjing) Co., Ltd., Nanjing (CN)

(72) Inventors: Zhongyang Wang, Shenzhen (CN); Hezhi Wang, Shenzhen (CN); Jie Zhang, Shenzhen (CN)

(73) Assignee: AAG Technologies (Nanjing) Co., Ltd., Nanjing (CN)

( * ) Notice: Subject to any disclaimer, the term of this patent is extended or adjusted under 35 U.S.C. 154(b) by 0 days.

(21) Appl. No.: 17/919,538

(22) PCT Filed: Aug. 10, 2022

(86) PCT No.: PCT/CN2022/111330

§ 371 (c)(1),
(2) Date: Oct. 18, 2022

(87) PCT Pub. No.: WO2024/007416

PCT Pub. Date: Jan. 11, 2024

(65) Prior Publication Data

US 2025/0122124 A1 Apr. 17, 2025

(30) Foreign Application Priority Data

Jul. 4, 2022 (CN) ........................ 202210787731.X

(51) Int. Cl.

| | |
|---|---|
| ***C04B 26/02*** | (2006.01) |
| ***C04B 38/02*** | (2006.01) |
| ***C04B 38/08*** | (2006.01) |
| ***H04R 1/02*** | (2006.01) |
| ***H04R 1/28*** | (2006.01) |
| *C04B 103/00* | (2006.01) |
| *C04B 111/52* | (2006.01) |

(52) U.S. Cl.

CPC .............. *C04B 26/02* (2013.01); *C04B 38/02* (2013.01); *C04B 38/08* (2013.01); *H04R 1/025* (2013.01); *H04R 1/028* (2013.01); *H04R 1/288* (2013.01); *C04B 2103/0049* (2013.01); *C04B 2103/0062* (2013.01); *C04B 2103/0093* (2013.01); *C04B 2111/52* (2013.01)

(58) Field of Classification Search

CPC ......... C04B 26/02; C04B 26/04; C04B 26/06; C04B 26/16; C04B 38/02; C04B 38/08; C04B 38/10; C04B 2103/0049; C04B 2103/0062; C04B 2103/0093; C04B 2111/52; C04B 14/047; C04B 24/2623; C04B 22/106; C04B 22/0013; C04B 20/002; C04B 40/0014; G10K 11/162; H04R 1/025; H04R 1/028; H04R 1/2876; H04R 1/288; H04R 2499/11

See application file for complete search history.

(56) References Cited

U.S. PATENT DOCUMENTS

2020/0027436 A1 * 1/2020 Shackleford .............. B32B 5/32

FOREIGN PATENT DOCUMENTS

CN 114495883 A * 5/2022 ............. H04R 1/021

OTHER PUBLICATIONS

English Translation of CN-114495883-A (Year: 2022).*

* cited by examiner

*Primary Examiner* — John M Cooney
(74) *Attorney, Agent, or Firm* — Wiersch Law Group

(57) ABSTRACT

A method for preparing a sound-absorbing material block, the method includes steps of mixing raw materials to prepare a mixed paste and filling the mixed paste into a speaker rear cavity of a speaker provided in advance, and then sequentially performing drying treatment and dehydration treatment to obtain the sound-absorbing material block. On one hand, the sound-absorbing material block is prepared by mixing the porous material, the gelling agent, the cross-linking agent, the binder, the foaming agent, and the solvent, so that the prepared sound-absorbing material block has high strength, is not prone to breakage, and has good performance. And on an other hand, the sound-absorbing material block adapted to the rear cavity of the speaker is directly prepared, so that steps of cutting and filling can be omitted, and a filling process is simplified.

4 Claims, 4 Drawing Sheets

SOUND-ABSORBING MATERIAL BLOCK, METHOD FOR PREPARING THEREOF, AND ELECTRONIC DEVICE

TECHNICAL FIELD

The present disclosure relates to a field of electroacoustic conversion, in particular to a sound-absorbing material block, a method for preparing thereof, and an electronic device.

BACKGROUND

With a continuous development of smart devices, current smart devices have higher requirements for audio quality. Generally, the larger a rear cavity of a speaker, the higher the audio quality. However, smart devices such as mobile phones, tablet computers, watches, etc. do not have an extra space as the rear cavity of the speaker, therefore, how to generate high-quality audio in a limited space becomes a problem to be solved in the related art. A common method is to fill the rear cavity with sound-absorbing materials to virtually increase a space of the rear cavity, thereby achieving an effect of improving the audio quality.

At present, the sound-absorbing materials filled in the rear cavity are mainly granular sound-absorbing materials, however, a particle size of each of the granular sound-absorbing materials is only between 200 μm and 500 μm, and when a vibrating diaphragm of the speaker vibrates, sound-absorbing particles vibrate with vibration of air, meanwhile, violent collisions may be generated between different particles, and phenomena such as powder falling and breakage are easily generated in a process of particle collisions, which leads to a decrease in performance of the sound-absorbing particles, and the falling powder may also pass through a screen to enter the speaker, which may even damage the speaker. Moreover, the sound-absorbing particles are difficult to fill with the rear cavity during filling, resulting in a low utilization rate of the rear cavity, and when the speaker is tilted or reversed, positions of the sound-absorbing particles in the rear cavity also changes accordingly, and the sound-absorbing particles in different positions and stacked states result in instability of acoustic performance of the speaker, and the performance cannot be optimized.

Therefore, in order to solve defects caused by the sound-absorbing particles, a person who skilled in the art attempts to prepare some sound-absorbing material blocks, but these sound-absorbing material blocks still need to be cut and adapted during a filling process, and morphology of the rear cavity is complicated, which leads to a relatively complex filling process, meanwhile, these sound-absorbing material blocks are relatively low in strength and prone to breakage, resulting in poor performance.

Therefore, it is necessary to provide a sound-absorbing material block, a method for preparing thereof, and an electronic device to solve technical problems mentioned above.

SUMMARY

A purpose of the present disclosure is to provide a sound-absorbing material block, a method for preparing thereof, and a related device, so as to solve problems of complex filling process, low strength, easy breakage, and poor performance of a current sound-absorbing material block.

In a first aspect, the present disclosure provides a method for preparing a sound-absorbing material block, the method including following steps:

step S1: mixing raw materials to prepare a mixed paste, where the raw materials include a porous material, a gelling agent, a cross-linking agent, a binder, a foaming agent, and a solvent, a content of the gelling agent is 1 wt % to 5 wt % of a mass of the porous material, a content of the cross-linking agent is 5 wt % to 20 wt % of a mass of the gelling agent, a content of the binder is 2 wt % to 10 wt % of the mass of the porous material, and a content of the foaming agent is 1 wt % to 5 wt % of the mass of the porous material; and step S2: filling the mixed paste into a speaker rear cavity of a speaker provided in advance, and then sequentially performing drying treatment and dehydration treatment to obtain the sound-absorbing material block.

Furthermore, the gelling agent is one or more of materials of hydroxymethyl cellulose sodium, hydroxypropyl methyl cellulose, sodium alginate, chitosan, polyethylene glycol, polyvinyl alcohol, and polypropylene chloride.

Furthermore, the cross-linking agent is one or more of glutaraldehyde, boric acid, calcium chloride, and calcium carbonate.

Furthermore, the porous material is zeolite and/or activated carbon, the zeolite is one or more of structures of an MFI molecular sieve, an MEL molecular sieve, and an FER molecular sieve, and a particle size of the zeolite is less than 10 μm.

Furthermore, the binder is one or more of polyacrylate, styrene-butadiene emulsion, polystyrene acrylate, polystyrene acetate, polyurethane resin, and polyethylene vinyl acetate salt.

Furthermore, the foaming agent is an inorganic foaming agent, and the inorganic foaming agent is one or more of hydrogen peroxide, ammonium bicarbonate, and sodium bicarbonate.

Furthermore, the foaming agent is an organic foaming agent, and the organic foaming agent is one or more of azodicarbonamide, polymer hollow microspheres, polyurethane foam particles, and PE foam particles.

Furthermore, the solvent is one or more of water, methanol, ethanol, butanol and ethyl acetate.

Furthermore, in the Step S1, the step of mixing the raw materials into the mixed paste includes following sub-steps:

step S11, stirring and mixing the porous material, the gelling agent, the binder, the foaming agent, and the solvent to obtain a slurry; and step S12: adding the cross-linking agent to the slurry to continue stirring and mixing to obtain the mixed paste.

Furthermore, in the step S2, the mixed paste is filled into the rear cavity of the speaker by injection, and the dehydration treatment is to bake and dehydrate the rear cavity of the speaker containing the mixed paste after being dried.

Furthermore, a method of the drying treatment is any one of low-temperature vacuum freeze-drying, microwave drying, supercritical drying, high-temperature heating drying, and vacuum heating drying.

In a second aspect, the present disclosure provides a sound-absorbing material block, including following components in percentage by mass: a porous material, a gelling agent, a cross-linking agent, and a binder, a content of the gelling agent is 1 wt % to 5 wt % of a mass of the porous material, a content of the cross-linking agent is 5 wt % to 20 wt % of a mass of the gelling agent, a content of the binder is 2 wt % to 10 wt % of the mass of the porous material.

Furthermore, a structure of the sound-absorbing material block is one of a sphere, an ellipsoid, or a polyhedron.

Furthermore, the sound-absorbing material block is made by the method for preparing the sound-absorbing material block mentioned above.

In a third aspect, the present disclosure provides a speaker box, including: a housing having an accommodation space, a sound-generating unit and a sound-guiding channel accommodated in the accommodation space, the housing includes an upper cover and a lower cover covered with the upper cover, and the sound-guiding channel is formed on the upper cover, the sound-generating unit, the upper cover, and the lower cover jointly enclose a rear cavity, the sound-generating unit and the upper cover are disposed at intervals and jointly enclose a front acoustic cavity, the front acoustic cavity communicates with outside through the sound-guiding channel, and the sound-guiding channel and the front sound cavity jointly form a front cavity, and the rear cavity is filled with the sound-absorbing material block mentioned above.

Furthermore, the sound-absorbing material block matches with a partial cavity or all cavity of the rear cavity.

Furthermore, the sound-absorbing material block includes an inner surface that is partially or entirely coated on the rear cavity.

Furthermore, the sound-absorbing material block is a whole block structure or a plurality of individual block structures.

In a fourth aspect, the present disclosure provides an electronic device, the electronic device is one of a mobile phone, a watch, a tablet computer, a sound box, and a notebook computer, and the electronic device is provided with the speaker box mentioned above.

Compared with the related art, on one hand, the sound-absorbing material block of the present disclosure is prepared by mixing the porous material, the gelling agent, the cross-linking agent, the binder, the foaming agent, and the solvent, so that the prepared sound-absorbing material block has high strength, is not prone to breakage, and has good performance. And on an other hand, by filling the mixed paste into the rear cavity of the speaker, and then sequentially performing the drying treatment and the dehydration treatment, the sound-absorbing material block adapted to the rear cavity of the speaker is able to be directly prepared, so that steps of cutting and filling is able to be omitted, and a filling process is simplified.

BRIEF DESCRIPTION OF DRAWINGS

In order to more clearly illustrate technical solutions in embodiments of the present disclosure, drawings that need to be used in description of the embodiments or the related art are briefly introduced below, obviously, the drawings in following description are merely some embodiments of the present disclosure, for those of ordinary skill in the art, other drawings may be obtained according to these drawings without creative efforts.

1—housing, 11—upper cover, 12—lower cover, 2—sound-generating unit, 3—sound-guiding channel, 4—sound-absorbing material block, 10—rear cavity, 20—front cavity, and 201—front acoustic cavity

DETAILED DESCRIPTION

The technical solutions in embodiments of the present disclosure are clearly and completely described below. Obviously, the described embodiments are only a part of embodiments of the present disclosure, rather than all of embodiments. All other embodiments obtained by a person who skilled in the art based on the embodiments of the present disclosure without creative efforts shall fall within the protection scope of the present disclosure.

A First Embodiment

Figure 1:
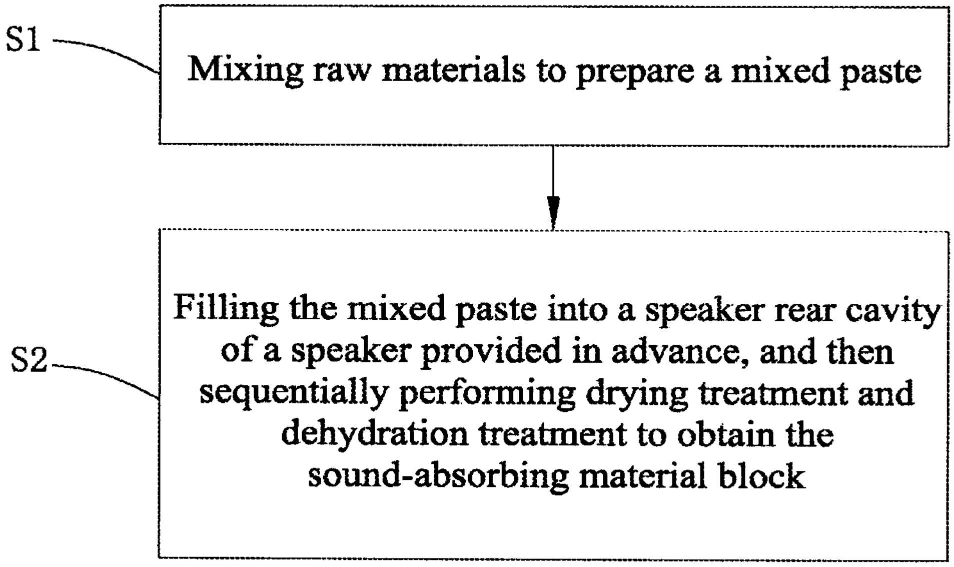
FIG. 1 is a schematic flowchart of a method for preparing a sound-absorbing material block according to one embodiment of the present disclosure.

As shown in FIG. 1, the embodiment of the present disclosure provides a method for preparing a sound-absorbing material block, the method includes following steps.

Step S1: mixing raw materials to prepare a mixed paste.

Specifically, the raw materials include a porous material, a gelling agent, a cross-linking agent, a binder, a foaming agent, and a solvent.

The porous material is zeolite and/or activated carbon, the zeolite is one or more of structures of an MFI molecular sieve, an MEL molecular sieve, and an FER molecular sieve, and a particle size of the zeolite is less than 10 μm.

The gelling agent is one or more of materials of hydroxymethyl cellulose sodium, hydroxypropyl methyl cellulose, sodium alginate, chitosan, polyethylene glycol, polyvinyl alcohol, and polypropylene chloride, and a content of the gelling agent is 1 wt % to 5 wt % of a mass of the porous material.

The cross-linking agent is one or more of glutaraldehyde, boric acid, calcium chloride, and calcium carbonate, and a content of the cross-linking agent is 5 wt % to 20 wt % of a mass of the gelling agent. The cross-linking agent selects a corresponding proportion according to a proportion of the gelling agent.

The binder is one or more of polyacrylate, styrene-butadiene emulsion, polystyrene acrylate, polystyrene acetate, polyurethane resin, and polyethylene vinyl acetate salt, and a content of the binder is 2 wt % to 10 wt % of the mass of the porous material.

The foaming agent may be selected from an inorganic foaming agent or an organic foaming agent. The inorganic foaming agent is one or more of hydrogen peroxide, ammonium bicarbonate, and sodium bicarbonate. The organic foaming agent is one or more of azodicarbonamide, polymer hollow microspheres, polyurethane foam particles, and PE foam particles. A content of the foaming agent is 1 wt % to 5 wt % of the mass of the porous material.

The solvent is one or more of water, methanol, ethanol, butanol, and ethyl acetate, and a content of the solvent is 80 wt % to 120 wt % of the mass of the porous material.

Various materials in the raw materials may be proportioned according to actual requirements, so as to obtain the sound-absorbing material block that has high strength, is not prone to breakage, and has good performance.

Figure 2:
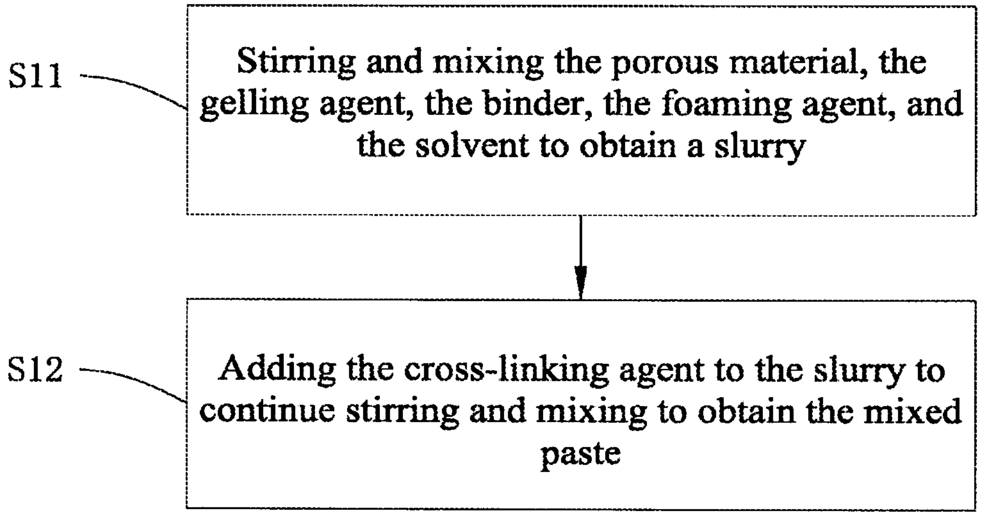
FIG. 2 is a schematic flowchart of sub-steps of step S1 according to one embodiment of the present disclosure.

Specifically, as shown in FIG. 2, the step S1 includes sub-steps:

step S11, stirring and mixing the porous material, the gelling agent, the binder, the foaming agent, and the solvent to obtain a slurry; and step S12: adding the cross-linking agent to the slurry to continue stirring and mixing to obtain the mixed paste.

Time for stirring and mixing in the step S11 and the step S12 is set according to actual requirements.

The mixed paste is able to stand for 24 hours without sedimentation, which is suitable for industrial preparation of the sound-absorbing material block.

Step S2, filling the mixed paste into a rear cavity of a speaker provided in advance, and then sequentially performing drying treatment and dehydration treatment to obtain the sound-absorbing material block.

Specifically, when filling the mixed paste into the rear cavity of the speaker, it is necessary to ensure that the rear cavity of the speaker is filled with the mixed paste.

The mixed paste is filled into the rear cavity of the speaker by injection. A method of the drying treatment is any one of low-temperature vacuum freeze-drying, microwave drying, supercritical drying, high-temperature heating drying, and vacuum heating drying. The dehydration treatment is to bake and dehydrate the rear cavity of the speaker containing the mixed paste after being dried, that is, the rear cavity of the speaker after being dried is directly baked and dehydrated, and the rear cavity of the speaker contains the mixed paste after the drying treatment.

During the drying treatment, the rear cavity of the speaker filled with the mixed paste is also directly dried.

After the drying treatment and dehydration treatment are completed, the solvent and the foaming agent in the mixed paste are completely removed, that is, the obtained sound-absorbing material block does not contain the solvent and the foaming agent.

Figure 3:
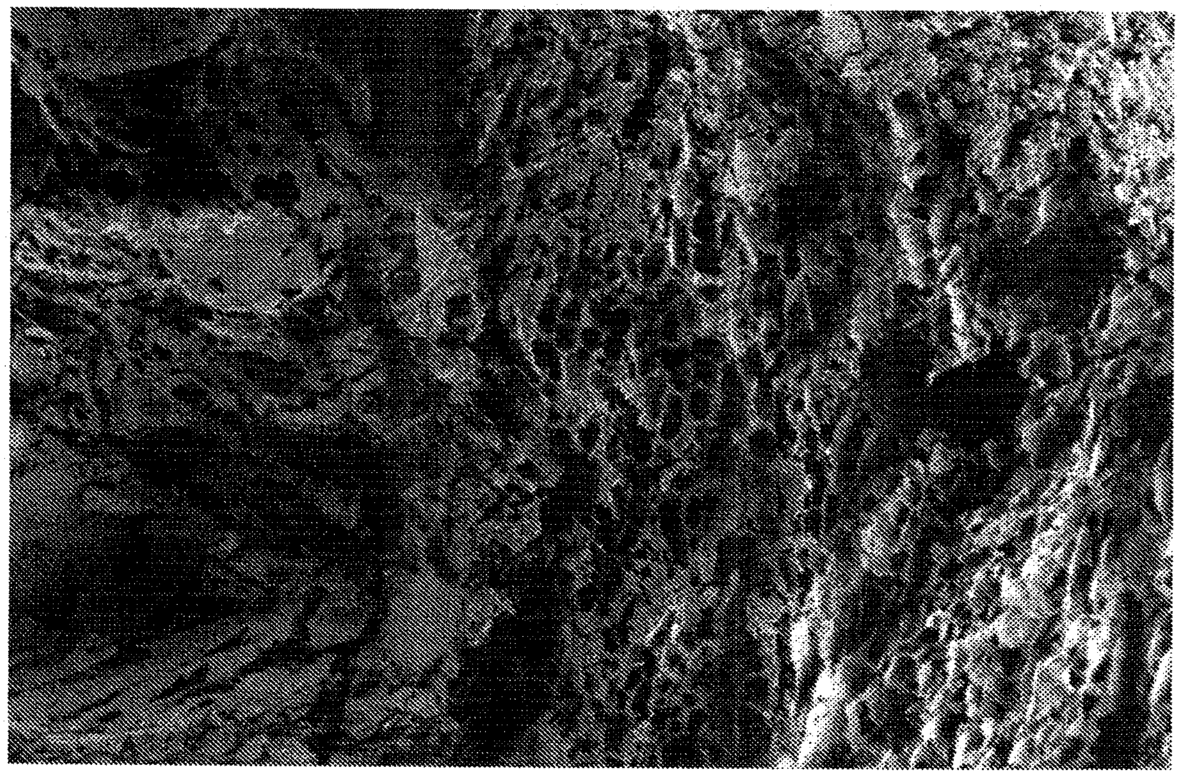
FIG. 3 is a scanning electron microscope (SEM) schematic diagram of a cross section of a sound-absorbing material block according to one embodiment of the present disclosure.

FIG. 3 is a scanning electron microscope (SEM) schematic diagram of a cross section of a sound-absorbing material block, and an internal structure thereof is able to be clearly seen from the schematic diagram.

Compared with the related art, on one hand, the sound-absorbing material block of the present disclosure is prepared by mixing the porous material, the gelling agent, the cross-linking agent, the binder, the foaming agent, and the solvent, so that the prepared sound-absorbing material block has high strength, is not prone to breakage, and has good performance. And on an other hand, by filling the mixed paste into the rear cavity of the speaker, and then sequentially performing drying treatment and dehydration treatment, the sound-absorbing material block adapted to the rear cavity of the speaker is able to be directly prepared, so that steps of cutting and filling can be omitted, and a filling process is simplified.

A Second Embodiment

The embodiment of the present disclosure provides a sound-absorbing material block, including following components in percentage by mass: a porous material, a gelling agent, a cross-linking agent, and a binder, a content of the gelling agent is 1 wt % to 5 wt % of a mass of the porous material, a content of the cross-linking agent is 5 wt % to 20 wt % of a mass of the gelling agent, a content of the binder is 2 wt % to 10 wt % of the mass of the porous material.

Since the solvent and the foaming agent of the sound-absorbing material block in the embodiment are removed during the drying treatment and dehydration treatment, the sound-absorbing material block does not include the solvent and the foaming agent in the first embodiment mentioned above.

Specifically, a structure of the sound-absorbing material block is one of a sphere, an ellipsoid, a tetrahedron, a trapezoid, a cuboid, and a cube. Of course, according to actual requirements, the structure may also be a complex polyhedron structure. If the sound-absorbing material block is a plurality of individual block structures, structures of the plurality of individual block structures may be same, for example, the sound-absorbing material block may be formed by combing one of a plurality of spheres, a plurality of trapezoids, and a plurality of cuboids. The structures of the plurality of individual block structures may also be different, for example, the sound-absorbing material block may be formed by a combination of various block structures of the sphere, the ellipsoid, the tetrahedron, and the trapezoid.

Specifically, the sound-absorbing material block is prepared by the method for preparing the sound-absorbing material block in the first embodiment, and the sound-absorbing material block is configured to fill the rear cavity of the speaker.

Since the sound-absorbing material block in the embodiment is prepared by the method for preparing the sound-absorbing material block in the first embodiment, the sound-absorbing material block in the embodiment can also achieve technical effects achieved by the method for preparing the sound-absorbing material block in the first embodiment, and details are not described again.

A Third Embodiment

Figure 4:
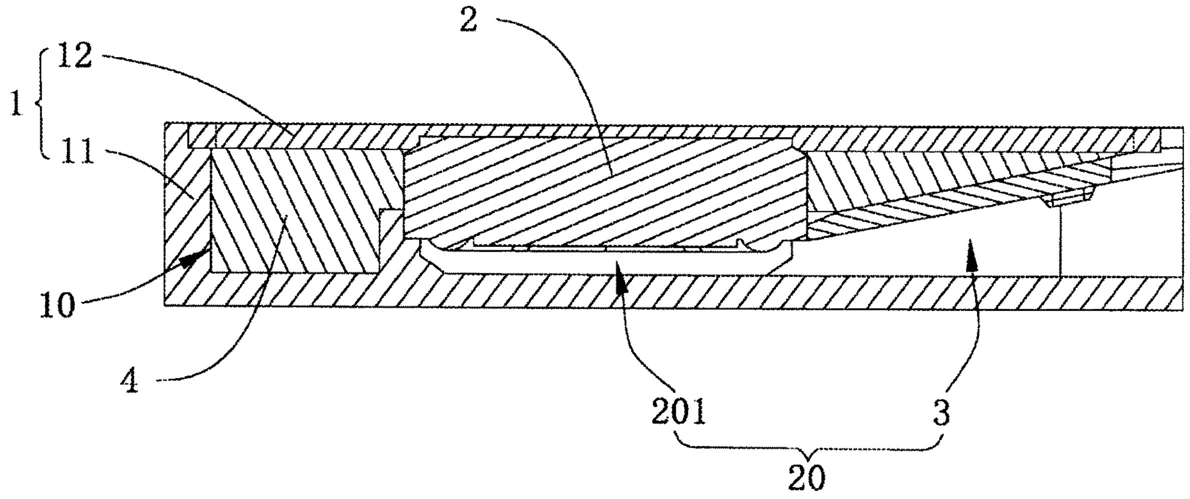
FIG. 4 is a cross-sectional schematic diagram of a speaker box according to one embodiment of the present disclosure.

As shown in FIG. 4, the embodiment of the present disclosure provides a speaker box, including a housing 1 having an accommodation space, a sound-generating unit 2 and a sound-guiding channel 3 accommodated in the accommodation space. The housing 1 includes an upper cover 11 and a lower cover 12 covered with the upper cover 11, and the sound-guiding channel 3 is formed on the upper cover 11. The sound-generating unit 2, the upper cover 11, and the lower cover 12 jointly enclose a rear cavity 10, the sound-generating unit 2 and the upper cover 11 are disposed at intervals and jointly enclose a front acoustic cavity 201, the front acoustic cavity 201 communicates with outside through the sound-guiding channel 3, and the sound-guiding channel 3 and the front sound cavity 201 jointly form a front cavity 20. And the rear cavity 10 is filled with the sound-absorbing material block 4.

The sound-absorbing material block 4 in the embodiment is the sound-absorbing material block in the second embodiment.

Specifically, the rear cavity 10 of the speaker in the first embodiment is same as or similar to the rear cavity 10 of the speaker in the embodiment.

Specifically, the sound-absorbing material block matches with a partial cavity or all cavity of the rear cavity, that is, it may be partially or completely filled in the rear cavity of the speaker. The sound-absorbing material block includes an inner surface that is partially or entirely coated on of the rear cavity. The sound-absorbing material block is a whole block structure or a plurality of individual block structures.

Since the sound-absorbing material block 4 filled in the rear cavity 10 of the speaker box in the embodiment is the sound-absorbing material block in the embodiment 2, the sound-absorbing material block 4 in the embodiment can also achieve technical effects achieved by the sound-absorbing material block in the second embodiment, and details are not described again.

A Fourth Embodiment

The embodiment of the present disclosure provides an electronic device, the electronic device is provided with the speaker box according to the third embodiment.

The electronic device is one of a mobile phone, a watch, a tablet computer, a sound box, and a notebook computer. Of course, according to actual requirements, the electronic device may also be a device with a speaker box structure, such as a portable game machine, a radio, etc.

Since the electronic device in the embodiment is provided with the speaker box in the third embodiment, the electronic device in the embodiment can also achieve technical effects achieved by the speaker box in the third embodiment, and details are not described again.

A Fifth Embodiment

The embodiment of the present disclosure provides a method for preparing a sound-absorbing material block, and the method includes following steps.

Step S101: weighing 1 wt % of sodium alginate, adding the 1 wt % of the sodium alginate to 43 wt % of water, and stirring for 20 minutes to form a uniform and transparent sodium alginate solution, then adding 50 wt % of zeolite, 4 wt % of polystyrene acrylate, and 2 wt % of hydrogen peroxide into the sodium alginate solution, and continuing to stir for 30 minutes to form a mixed slurry.

Step S102: preparing a calcium chloride aqueous solution with a concentration of 1%, and then mixing 5 wt % of the calcium chloride aqueous solution into the mixed slurry by dropping while stirring, and after dropping, continuing to stir for 20 minutes, and then aging for 2 hours to obtain a gel-like mixed paste.

Materials in the step S101 and the step S102 are metered according to a mass ratio, and a content of the slurry is 97 wt % of a mass of the gel-like mixed paste.

Step S103: sucking a certain amount of the gel-like mixed paste using an injector, then injecting the gel-like mixed paste into the rear cavity of the speaker, filling the rear cavity of the speaker with the gel-like mixed paste, and then freeze-drying the rear cavity of the speaker, and after the drying treatment is completed, placing the rear cavity of the speaker in an environment at 80° C. for baking for 2 hours for the dehydration treatment, and finally obtaining the sound-absorbing material block.

A Sixth Embodiment

The embodiment of the present disclosure provides a method for preparing a sound-absorbing material block, and the method includes following steps.

Step S201: weighing 1 wt % of sodium alginate, adding the 1 wt % of the sodium alginate to 43 wt % of water and stirring for 20 minutes to form a uniform and transparent sodium alginate solution, then adding 50 wt % of zeolite, 4 wt % of styrene-butadiene emulsion, and 2 wt % azodicarbonamide into the sodium alginate solution, and continuing to stir for 30 minutes to form a mixed slurry.

Step S202: adding 0.04 wt % of calcium chloride powder into the mixed slurry, stirring for 30 minutes until a gel is produced, and then aging for 4 hours to obtain a gel-like mixed paste.

Materials in the step S201 and the step S202 are metered according to a mass ratio, and a content of the slurry is 97 wt % of a mass of the gel-like mixed paste.

Step S203, sucking a certain amount of the gel-like mixed paste using an injector, then injecting the gel-like mixed paste into the rear cavity of the speaker, filling the rear cavity of the speaker with the gel-like mixed paste, and then freeze-drying the rear cavity of the speaker, and after the drying treatment is completed, placing the rear cavity of the speaker in an environment at 100° C. for baking for 1 hours for the dehydration treatment, and finally obtaining the sound-absorbing material block.

A Seventh Embodiment

The embodiment of the present disclosure provides a method for preparing a sound-absorbing material block, and the method includes following steps.

Step S301: weighing 2 wt % of polyvinyl alcohol, adding the 2 wt % of the polyvinyl alcohol to 42 wt % of water and stirring for 20 minutes to form a uniform polyvinyl alcohol aqueous solution, then adding 50 wt % zeolite, 5 wt % polyethylene vinyl acetate salt, and 1 wt % ammonium bicarbonate into the polyvinyl alcohol aqueous solution, and continuing to stir for 30 minutes to form a mixed slurry.

Step S302, preparing a boric acid solution with a concentration of 5%, and then mixing 2 wt % of the boric acid solution into the mixed slurry by dropping while stirring, and after dropping, continuing to stir for 20 minutes, and then aging for 6 hours to obtain a gel-like mixed paste.

Materials in the step S301 and the step S302 are metered according to a mass ratio.

Step S303: sucking a certain amount of the gel-like mixed paste using an injector, then injecting the gel-like mixed paste into the rear cavity of the speaker, filling the rear cavity of the speaker with the gel-like mixed paste, and then freeze-drying the rear cavity of the speaker, and after the drying treatment is completed, placing the rear cavity of the speaker in an environment at 80° C. for baking for 2 hours for the dehydration treatment, and finally obtaining the sound-absorbing material block.

An Eighth Embodiment

The embodiment of the present disclosure provides a method for preparing a sound-absorbing material block, and the method includes following steps:

Step S401: weighing 2.5 wt % of polyacrylamide, adding the 2.5 wt % of the polyacrylamide to 42 wt % of water and stirring for 20 minutes to form a uniform polyacrylamide aqueous solution, then adding 50 wt % zeolite, 3 wt % polyethylene vinyl acetate salt, and 2 wt % azodicarbonamide into the polyacrylamide aqueous solution, and continuing to stir for 30 minutes to form a mixed slurry.

Step S402: adding 0.2 wt % glutaraldehyde into the mixed slurry, stirring for 30 minutes, and then aging for 4 hours to obtain a gel-like mixed paste.

Materials in the step S401 and the step S402 are metered according to a mass ratio.

Step S403: sucking a certain amount of the mixed paste using an injector, then injecting the gel-like mixed paste into the rear cavity of the speaker, filling the rear cavity of the speaker with the gel-like mixed paste, and then freeze-drying the rear cavity of the speaker, and after the drying treatment is completed, placing the rear cavity of the speaker in an environment at 110° C. for baking for 1 hours for the dehydration treatment, and finally obtaining the sound-absorbing material block.

A First Comparative Example

The embodiment of the present disclosure provides a method for preparing a sound-absorbing material block, and the method includes following steps.

Step S501: weighing 41 wt % of water, adding 50 wt % of zeolite, 4 wt % of polystyrene acrylate, and 5 wt % of hydrogen peroxide into the water, and stirring for 30 minutes to form a mixed slurry.

Materials in the step S501 are metered according to a mass ratio.

Step S502, sucking a certain amount of the mixed slurry using an injector, then injecting the mixed paste into the rear cavity of the speaker, filling the rear cavity of the speaker with the mixed paste, and then freeze-drying the rear cavity of the speaker, and after the drying treatment is completed, placing the rear cavity of the speaker in an environment at 100° C. for baking for 2 hours for the dehydration treatment, and finally obtaining the sound-absorbing material block.

A Second Comparative Example

An embodiment of the present disclosure provides a method for preparing a sound-absorbing material block, and the method includes following steps.

Step S601: weighing 2 wt % of sodium hydroxymethyl cellulose, adding 38 wt % of water and stirring for 20 minutes to form a uniform and transparent aqueous solution of hydroxymethyl cellulose, then adding 50 wt % of zeolite, 5 wt % of polyacrylate, and 5 wt % of ammonium bicarbonate into the aqueous solution of hydroxymethyl cellulose, and continuing to stir for 30 minutes to form a mixed slurry.

Materials in the step S601 are metered according to a mass ratio.

Step S502, sucking a certain amount of the mixed slurry using an injector, then injecting the mixed paste into the rear cavity of the speaker, filling the rear cavity of the speaker with the mixed paste, and then freeze-drying the rear cavity of the speaker, and after the drying treatment is completed, placing the rear cavity of the speaker in an environment at 80° C. for baking for 2 hours for the dehydration treatment, and finally obtaining the sound-absorbing material block.

In order to facilitate evaluation of performance of the sound-absorbing material blocks in the embodiments of the present disclosure, an acoustic performance test is performed on the sound-absorbing material blocks in the first embodiment to the eighth embodiment and conventional sound-absorbing particles. For convenience of comparison, the sound-absorbing material blocks in the first embodiment to the eighth embodiment are made into cubes with a volume of 10 mm*12 mm*2 mm/0.24 ml, meanwhile, a volume of sound-absorbing particles with conventional and excellent performance in the art is also 0.24 ml, a volume of the rear cavity of the speaker of a test tool is 0.4 ml. Meanwhile, a drop performance test is performed on different embodiments and comparative examples, and test results obtained are shown in following table:

Drop performance test table

| Sample | Resonant frequency reduction Δ F0 (Hz) | Drop performance test |
|---|---|---|
| Fifth Embodiment | 171 | No change, no powder falling |
| Sixth Embodiment | 165 | No change, no powder falling |
| Seventh Embodiment | 156 | No change, no powder falling |
| Eighth Embodiment | 161 | No change, no powder falling |
| First comparative example | 131 | Serious breakage, powder falling |
| Second comparative example | 152 | Breakage, small amount of powder falling |
| Conventional sound-absorbing particles | 160 | No change, no powder falling |

It can be seen from the above table that performance of the sound-absorbing material blocks prepared in the fifth embodiment, the sixth embodiment, and the eighth embodiment are better than that of the conventional sound-absorbing particles, and the performance of the fifth embodiment and the sixth embodiment is significantly better than that of the conventional sound-absorbing particles. In addition, unique gel performance of the sound-absorbing material block in the present disclosure determines that application scenes are wider, storage time is longer, and the sound-absorbing material block is directly filled into the rear cavity of the speaker by injection, space of the rear cavity of the speaker is utilized to maximum extent, and the acoustic performance of the speaker box is improved.

It can also be seen that compared with the fifth embodiment to the eighth embodiment, performance of the first comparative example is relatively low, and the prepared sound-absorbing material block has a loose structure, low strength, and severe breakage, which is entirely due to the fact that no cross-linking agent as a gel material is added as a support. In addition, in a process of material preparation, the slurry is prone to sedimentation, which is not suitable for industrial preparation.

Above descriptions is merely an embodiment of the present disclosure, and is not intended to limit the scope of the present disclosure. Any equivalent structure or equivalent process transformation made by using the description and the accompanying drawings of the present disclosure, or directly or indirectly applied to other related technical fields, is intended to be included in the patent protection scope of the present disclosure.

What is claimed is:

1. A method for preparing a sound-absorbing material block, comprising steps of:

step S1: mixing raw materials to prepare a mixed paste, where the raw materials comprise a porous material, a gelling agent, a cross-linking agent, a binder, a foaming agent, and a solvent, a content of the gelling agent is 1 wt % to 5 wt % of a mass of the porous material, a content of the cross-linking agent is 5 wt % to 20 wt % of a mass of the gelling agent, a content of the binder is 2 wt % to 10 wt % of the mass of the porous material, and a content of the foaming agent is 1 wt % to 5 wt % of the mass of the porous material; the cross-linking agent as a gel material is added as a support in the raw materials;

the gelling agent is one or more of materials of hydroxymethyl cellulose sodium, hydroxypropyl methyl cellulose, sodium alginate, chitosan, polyethylene glycol, polyvinyl alcohol, and polypropylene chloride; the cross-linking agent is one or more of glutaraldehyde, boric acid, calcium chloride, and calcium carbonate; the porous material is zeolite and/or activated carbon, the zeolite is one or more of structures of an MFI molecular sieve, an MEL molecular sieve, and an FER molecular sieve, and a particle size of the zeolite is less than 10 μm; the binder is one or more of polyacrylate, styrene-butadiene emulsion, polystyrene acrylate, polystyrene acetate, polyurethane resin, and polyethylene vinyl acetate salt; the foaming agent is an inorganic foaming agent or an organic foaming agent, and the inorganic foaming agent is one or more of hydrogen peroxide, ammonium bicarbonate, and sodium bicarbonate; and the organic foaming agent is one or more of azodicarbonamide, polymer hollow microspheres, polyurethane foam particles, and PE foam particles; the solvent is one or more of water, methanol, ethanol, butanol, and ethyl acetate; and step S2: filling the mixed paste into a speaker rear cavity of a speaker provided in advance, and then performing drying treatment and dehydration treatment to obtain the sound-absorbing material block.

2. The method for preparing the sound-absorbing material block according to claim 1, wherein in the Step S1, the step of mixing the raw materials into the mixed paste comprises sub-steps of:

step S11: stirring and mixing the porous material, the gelling agent, the binder, the foaming agent, and the solvent to obtain a slurry; and step S12: adding the cross-linking agent to the slurry to continue stirring and mixing to obtain the mixed paste.

3. The method for preparing the sound-absorbing material block according to claim 1, wherein in the step S2, the mixed paste is filled into the rear cavity of the speaker by injection; and the dehydration treatment is to bake and dehydrate the rear cavity of the speaker containing the mixed paste after being dried.

4. The method for preparing the sound-absorbing material block according to claim 1, wherein a method of the drying treatment is any one of low-temperature vacuum freeze-drying, microwave drying, supercritical drying, high-temperature heating drying, and vacuum heating drying.

* * * * *